Patented Oct. 17, 1944

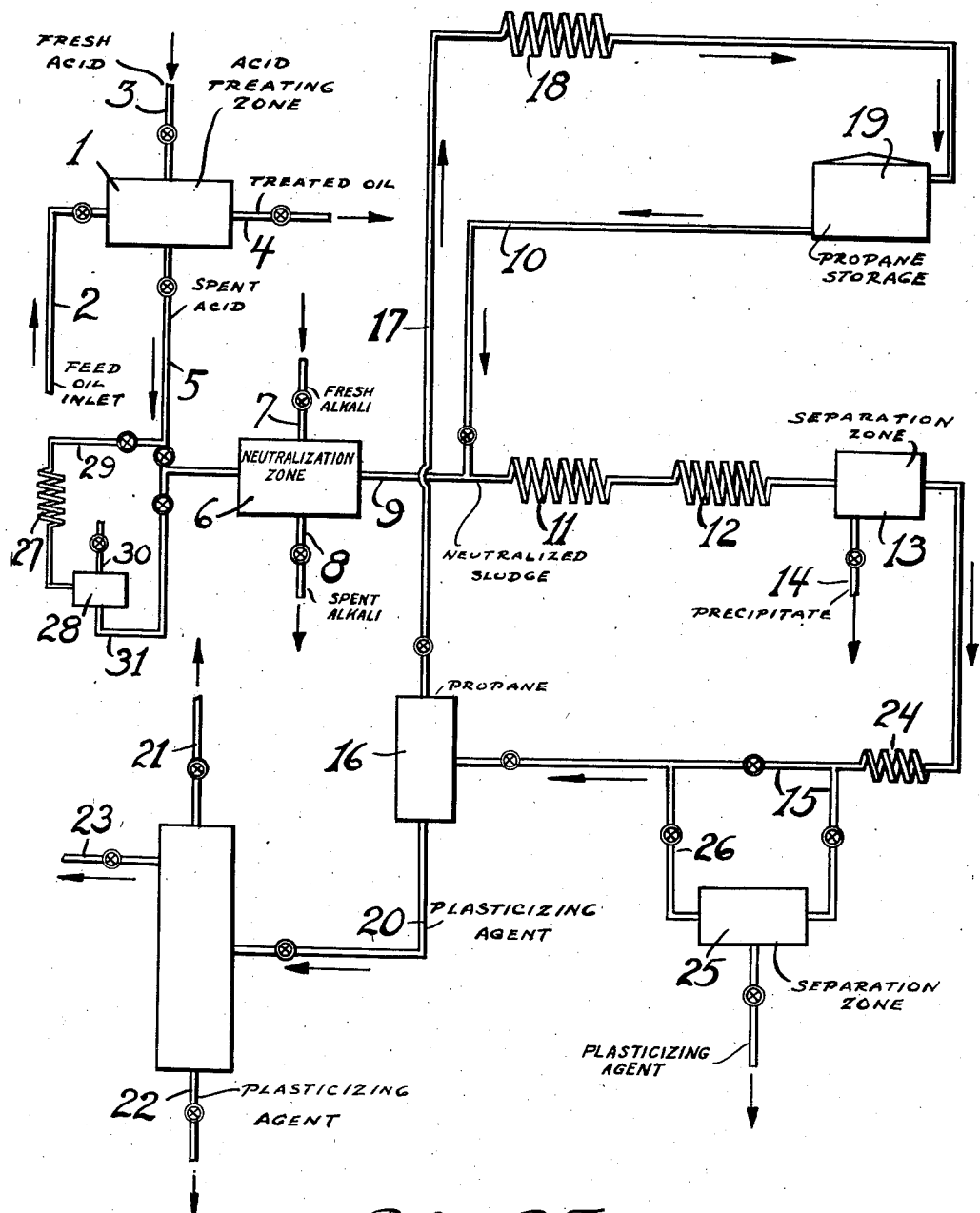

2,360,320

UNITED STATES PATENT OFFICE 2,360,320

METHOD OF PRODUCING PLASTICIZING AGENTS FROM ACID SLUDGE

Robert P. Ferguson, Cranford, N. J., assignor to Standard Oil Development Company, a corporation of Delaware Application May 24, 1941, Serial No. 395,116

8 Claims. (Cl. 196—34)

The present invention is concerned with the production of plasticizing agents suitable for use in the manufacture of rubber-like materials. The invention more particularly relates to a method of producing a plasticizing agent from acid sludges secured in the refining of oils. In accordance with the present process, a desirable agent suitable for use in the plasticizing of rubber-like materials is segregated from acid sludges by a process which involves neutralization of the acid sludge, dissolving the neutralized sludge in a light hydrocarbon, and subjecting the same to elevated temperatures and pressures, whereby objectionable constituents are removed as a precipitate. The solution is separated from the precipitate and the desirable plasticizing agent recovered therefrom.

In the refining of oils, particularly in the manufacture of lubricating oils, it is a conventional procedure to treat the oil with a reagent, such as a mineral acid, in order to remove objectionable constituents therefrom, which otherwise would tend to polymerize and form sludge therein. Reagents generally employed are an acid of sulfur, an acid of phosphorus, and anhydrous aluminum chloride. The acid generally utilized comprises sulfuric acid having a concentration in the range from about 80% to about 98%. While these processes have been entirely satisfactory in improving the quality of the oil, the loss of yield at times is appreciable. In order to compensate for this loss in yield, various attempts have been made to recover and to utilize the constituents which are soluble in the acid and removed with the acid sludge.

These constituents removed by acid treatment are generally characterized by the fact that they polymerize and form gums and sludge at the elevated temperatures and pressures prevalent in the engine if allowed to remain in the lubricating oil. On treatment of petroleum lubricating oil fractions with acid a portion of these materials reacts with the acid to form polymers, sludge and asphalt-like substances while the remaining portion dissolves in the reaction mixture of acid and sludge. These dissolved constituents are useful as plasticizers for rubber and rubber-like materials, provided they can be satisfactorily separated from the mixture of acid and sludge, and obtained free of oily constituents. The oily constituents are those substances in petroleum oil not soluble in 98% sulfuric acid. Previous attempts have been made to separate these desirable plasticizers by neutralizing the acid sludge and distilling the neutralized material at reduced pressures. At the temperatures necessary to distill the heavier and more desirable fractions from the asphalt-like materials, these heavier fractions are decomposed and the product obtained is a mixture of the less desirable light fractions and the materials produced by cracking the heavier and more desirable plasticizers. Furthermore, the cost of this operation is prohibitively high inasmuch as a hard coke-like material remains in the still and must be removed after each operation.

I have now discovered that provided the oil-free acid sludge be treated in a particular arrangement and sequence of stages it is possible to separate these materials, which are readily adapted for utilization as softening or plasticizing agents for rubber and rubber-like materials, without decomposition and in a continuous manner.

In the processing of rubbery materials, and synthetic polymers, it is desirable to plasticize and soften these substances before the various milling and molding operations. These rubbery materials, such as natural rubber and the various synthetic polymers, are characterized by having a strong tendency, when stretched or deformed, to return to their original form when the stress is released. Due to this characteristic, it is difficult to process these rubbery materials on the mill, and to mold them satisfactorily into shapes which follow accurately the contours of the mold. Various attempts have been made to overcome this difficulty. For example, it has been customary to plasticize rubber and the various synthetic polymers by the addition thereto of many types of substances, such as oils, fats, waxes, and the like, including solvent extracted oils, such as Edeleanu extracts obtained in the treatment of petroleum distillates; solvent extracts of coastal and other petroleum oils; tars and the like. These substances, when mixed with the rubbery materials, cause them to flow more easily, and as a result they are easier to process on the mill, and to mold more accurately.

However, many of these substances do not sufficiently plasticize the rubber materials and often tend to impart undesirable characteristics to the finished product. For example, they reduce its tensile strength and increase its elongation; as well as increase the milling time and require greater milling power. Furthermore, any oily constituents present tend to bloom to the surface, imparting a greasy, slippery surface to the product. In other instances, the plasticizing substances volatilize at temperatures within the vulcanizing or curing temperature range; and on standing, tend to devulcanize the rubber or polymers.

In accordance with my process, the oil-free acid sludge is neutralized with a suitable neutralization agent, the neutralized product then dissolved in a liquefied normally gaseous hydrocarbon, the mixture raised to an elevated temperature and pressure, under conditions whereby undesirable constituents precipitate. The solution containing the desirable plasticizing agent is removed from the precipitate and recovered therefrom.

The process of my invention may be readily understood by reference to the attached drawing illustrating a modification of the same. For the purpose of description it is assumed that the feed oil comprises a petroleum oil boiling above about 700° F. at atmospheric pressure and has a gravity in the range from about 30° A. P. I. to about 15° A. P. I. The feed oil is introduced into acid treating zone 1 by means of line 2. Acid, which for the purpose of description is taken to be a 98% concentrated sulfuric acid, is introduced into acid treating zone 1 by means of line 3. Temperature and pressure conditions as well as other operating conditions are adjusted to secure the desired removal of the objectionable constituents from the feed oil. The treated oil is withdrawn from treating zone 1 by means of line 4 and handled as desired.

The acid sludge free of entrained oil is withdrawn from zone 1 by means of line 5 and passed to neutralization zone 6 wherein the same is neutralized by means of a suitable alkaline reagent. For the purpose of description it is assumed that the alkaline reagent comprises a sodium hydroxide solution which is introduced by means of line 7. The spent sodium hydroxide solution is withdrawn by means of line 8 while the neutralized acid sludge is removed by means of line 9 and blended with a liquefied normally gaseous hydrocarbon which is introduced into line 9 by means of line 10. The solution is passed through mixing zone 11, heating zone 12, and introduced into separation zone 13. For the purpose of description it is assumed that the liquefied normally gaseous hydrocarbon comprises liquefied propane and that the solution is heated to a temperature of about 120° to about 180° F. Sufficient pressure is maintained on the system to retain the propane in the liquid phase. Under these conditions, a precipitate is formed in separation zone 13 which is removed by means of line 14. The propane solution comprising the desired reagent is removed from zone 13 by means of line 15 and introduced into solvent recovery zone 16 wherein the propane is removed from the reagent. The propane is removed by means of line 17, passed through condensing zone 18, and returned to propane storage 19.

The crude plasticizing agent is removed from solvent recovery zone 16 by means of line 20 and further refined if desired. A particularly preferred modification of the invention comprises refining the crude plasticizing agent in a manner to segregate the relatively low boiling constituents which are relatively undesirable, intermediate boiling constituents which are relatively more desirable, and relatively high boiling constituents which are very desirable without subjecting the relatively high boiling constituents to excessive temperatures which would crack the same. This separation of the respective constituents may be secured by an operation which comprises distilling the agent in order to remove an overhead fraction by means of line 21, an intermediate boiling fraction by means of line 23 and the desirable high boiling fraction by means of line 22. This separation of the agent into several fractions is preferably accomplished by heating the solution of agent and light hydrocarbon solvent from line 15 to temperatures above those employed in the initial precipitation and removing the heavier fractions of plasticizer as a precipitated phase and returning the solution of lighter fractions in propane to still 16 for solvent recovery. If this preferred operation be employed, the solution removed from zone 13 is further heated in zone 24 and passed to separation zone 25. The high boiling plasticizing agent is removed and any solvent removed therefrom. The heated solution is removed by means of line 26 and passed to solvent recovery zone 16 and handled as described. These operations may be employed in conjunction with one another. The amount of high boiling plasticizing agent segregated will vary considerably depending upon the character of the oil treated. For example, it is preferred to segregate approximately 50% of the total plasticizing agent segregated in the solution removed from the separation zone. This may be secured by a distillation operation as described after removal of the solvent or by heating the solution approximately 20° to 25° F. above the initial precipitation temperature.

The process of the present invention may be widely varied. It is to be understood that the respective zones may comprise any suitable number and arrangement of units. If the sludge removed from zone 1 by means of line 5 contains entrained oil as a result of incomplete settling in zone 1, it is necessary to pass the sludge to an oil separation zone. This is preferably accomplished by passing the acid sludge through heating zone 27 by means of line 29, followed by passing the heated sludge into separation zone 28. The entrained oil rises and is removed by means of line 30 while the oil-free sludge is removed by means of line 31, passed to neutralization zone 6 and handled as described. The extent to which the acid sludge is heated may vary considerably. However, in order to secure an oil-free sludge, it is desired to heat the separated sludge to a temperature in the range above 200° F., preferably to a temperature in the range from about 250° F. to 300° F., followed by separation of the oil layer.

The invention essentially comprises separating an oil-free acid sludge, neutralizing the same, dissolving the neutralized acid sludge in a liquefied normally gaseous hydrocarbon, removing the precipitate, and recovering the desired plasticizing agent from the solution.

The sludge employed may comprise acid sludge secured from any acid treating operation in which petroleum oils are refined. However, in general we have found that the preferred sludges are those secured when treating oils boiling in the lubricating oil boiling range, and preferably from the lubricating oil fractions of naphthenic type crudes such as from Colombian and coastal type crudes.

Although any mineral acid may be employed, it is desirable that the acid comprise sulfuric acid, preferably having an acid concentration in the range from about 92 to 100%.

The acid sludge may be neutralized by any suitable alkaline reagent as, for example, sodium hydroxide, calcium hydroxide, magnesium hydroxide, sodium carbonate, calcium carbonate, and the like. However, in general we prefer to use the alkali metal hydroxide solutions, such as a sodium hydroxide and a potassium hydroxide solution of from about 30° to 60° Baumé, or powdered calcium hydroxide, or sodium carbonate.

The neutralized sludge is dissolved in a low boiling hydrocarbon as, for example, a fraction comprising hydrocarbon constituents having five and less carbon atoms in the molecule. In general, it is preferred to use liquefied normally gaseous hydrocarbons as, for example, propane, butane, ethane, and the like as well as mixtures of the same. The amount of solvent used will vary widely depending upon various operating conditions. In general, I prefer to employ at least an amount sufficient to secure a complete solution of the carbonaceous constituents at the lower temperatures. It is preferred to employ from about 1 to about 7 volumes of solvent per volume of sludge.

The temperatures employed will vary depending upon the nature of the neutralized sludge and the amount it is desired to precipitate. The mixture of neutralized sludge and propane is heated to a temperature above about 100° F., preferably to a temperature in the range from about 110° F. to about 190° F. The temperature of precipitation will also vary greatly depending upon the particular solvent employed. For example, when using the solvents below, the temperatures are as follows:

| Solvent | Maximum temperature | Minimum temperature | Preferred temperature range |
|---|---|---|---|
| | °F. | °F. | °F. |
| Ethane | 90 | 10 | 25-85 |
| Propane | 206 | 80 | 100-190 |
| Butane | 306 | 100 | 130-280 |
| Pentane | 387 | 125 | 150-350 |

The preferred pressure is the pressure equal to the vapor pressure of the solution at the temperature employed.

In order to illustrate the invention further, the following example is given which should not be construed as limiting the same in any manner whatsoever:

*Example*

The oil-free acid sludge, obtained by acid treating the light lube fraction of 21° A. P. I. from Colombian crude, was neutralized with magnesium hydroxide and the neutralized sludge separated from the magnesium sulfate. A portion of this neutralized sludge was dissolved in a volume of propane equivalent to 6 volumes of the sludge, the mixture heated to 140° F., and the precipitated asphaltic-like phase separated from the upper phase of plasticizers dissolved in the propane.

A second portion of the neutralized sludge was dissolved in a volume of isopentane equivalent to 3 volumes of the sludge and the mixture heated to 200° F. The precipitate phase, under these conditions, was a black powder and the upper phase a solution of plasticizers dissolved in the isopentane. The approximate yields and inspections of the plasticizers separated in these two operations were as follows:

| Operation | 1 | 2 |
|---|---|---|
| Hydrocarbon employed | Propane | Isopentane. |
| Treating temperature °F | 140 | 200. |
| Approximate yield of plasticizer—per cent on sludge | 35 | 60. |
| Viscosity of plasticizer at 210° F.—S. S. U. | 74 | 405. |

What I claim as new and wish to protect by Letters Patent is:

1. Process for the segregation of an agent adapted for plasticizing rubber-like materials, which comprises treating a petroleum oil with a sulfuric acid, separating the acid sludge in substantially oil-free condition, neutralizing the separated sludge with an alkaline reagent and removing the spent alkaline reagent therefrom, dissolving the neutralized sludge in a liquid low boiling hydrocarbon solvent, the hydrocarbon components of said solvent containing not more than five carbon atoms to the molecule, heating the same under pressure to maintain the solvent in the liquid phase and separating the precipitate therefrom, removing the solution from the precipitate and segregating at least part of said plasticizing agent.

2. Process as defined by claim 1, in which the solution removed from the precipitate is treated to separate high-boiling plasticizing agent therefrom and the remaining solution is distilled to recover the liquid low-boiling hydrocarbon solvent and remaining plasticizing agent.

3. Process as defined by claim 1 in which said petroleum oil is an oil boiling in the lubricating oil boiling range, said acid is a sulfuric acid having a concentration in the range from about 90% to 98%, said alkaline reagent is an alkali metal hydroxide solution, and said low boiling hydrocarbon is a liquefied normally gaseous hydrocarbon.

4. Process as defined in claim 1 in which said petroleum oil is an oil boiling in the lubricating oil boiling range, said acid is a sulfuric acid having a concentration in the range from about 90% to 98%, said alkaline reagent is an alkali metal hydroxide solution, said low boiling hydrocarbon solvent comprises liquefied propane, and the propane solution of the neutralizing sludge is heated to a temperature of about 120° F. to 180° F.

5. Process as defined by claim 1 in which said agent is separated from the solution removed from said precipitate by further heating the same to a temperature of about 20 to 25° F. above the initial precipitation temperature.

6. Process for the segregation of an agent suitable for plasticizing rubber-like materials which comprises treating a petroleum oil boiling above 700° F. with a sulfuric acid, separating an oil-free acid sludge, neutralizing said oil-free acid sludge with an alkaline reagent, separating the spent alkaline reagent and dissolving said neutralized sludge in a liquid low boiling hydrocarbon solvent, the hydrocarbon components of said solvent containing not more than five carbon atoms to the molecule, heating the solution to an elevated temperature under pressure to maintain the solvent in the liquid phase, whereby a precipitate forms, separating the precipitate from the solution, removing the low boiling hydrocarbon solvent, and recovering the plasticizing agent therefrom.

7. Process as defined by claim 6, in which said plasticizing agent recovered from said solution is treated in a manner to segregate a desirable high boiling fraction thereof.

8. Process as defined by claim 6, in which said mineral acid comprises a sulfuric acid having a concentration in the range from about 90% to 98% and in which the acid sludge is freed of oil by heating the separated acid sludge to a temperature above 200° F. whereby the oil separates and is removed.

ROBERT P. FERGUSON.